United States Patent
Gross, II et al.

(12) 
(10) Patent No.: US 6,703,060 B1
(45) Date of Patent: Mar. 9, 2004

(54) ALL NATURAL ACCELERATED AGING OF DISTILLED SPIRITS

(75) Inventors: Remy F. Gross, II, Shreveport, LA (US); John P. Delmore, Bossier City, LA (US); Walter E. Buske, Las Vegas, NV (US)

(73) Assignee: Kairos Corporation, Shreveport, LA (US)

( * ) Notice: Subject to any disclaimer, the term of this patent is extended or adjusted under 35 U.S.C. 154(b) by 127 days.

(21) Appl. No.: 09/440,037

(22) Filed: Nov. 12, 1999

(51) Int. Cl.$^7$ ............................................. C12H 1/04
(52) U.S. Cl. ................................ 426/422; 426/552
(58) Field of Search ................................. 426/592, 422

(56) References Cited

U.S. PATENT DOCUMENTS

| | | |
|---|---|---|
| 675,173 A | 5/1901 | Spink |
| 2,092,866 A | 9/1937 | Wisniewski |
| 2,119,234 A | 5/1938 | Krebs et al. |
| 2,132,435 A | 10/1938 | Reiman |
| 2,185,206 A | 1/1940 | Little |
| 2,347,783 A | 5/1944 | Krebs |
| 2,807,547 A | 9/1957 | Nickol |
| 4,173,656 A | 11/1979 | Duggins .................... 426/422 |
| 4,350,708 A | 9/1982 | Ruiz de Palacios |
| 4,576,826 A | 3/1986 | Liu et al. |
| 4,956,194 A | 9/1990 | Gos |
| 5,102,675 A | 4/1992 | Howell et al. |
| 6,203,836 B1 | 3/2001 | Gross, II et al. ............ 426/422 |

FOREIGN PATENT DOCUMENTS

| | | |
|---|---|---|
| EP | 634108 | 1/1995 |
| FR | 419 591 A | 1/1911 |
| GB | 500081 | 2/1939 |
| GB | 957 972 A | 5/1964 |
| GB | 2 206 605 | 1/1989 |
| WO | 97 04072 A | 2/1997 |

OTHER PUBLICATIONS

Baldwin and Andreasen, "Congener Development in Bourbon Whisky Matured at Various Proofs for Twelve Years," Journal of the AOAC, 57(4):940–50, 1974.

Baldwin, et al., "Aromatic Congener Formation in Maturation of Alcoholic Distillates," J. Agr. Food Chem., 15(3):381–85, 1967.

Bureau of Alcohol, Tobacco and Firearms, Treasury, § 2.5 "Meaning of Terms," T.D. ATF–48.44 FR 55838, 1979.

Gross II, et al., U.S. Ser. No. 08/449,927, filed May 25, 1995.

Liebman and Rosenblatt, "Changes in whiskey While Maturing," Industiral and Engineering Chemistry, 35(9):994–1002, 1943.

Liebman and Scherl, "Changes in Whisky While Maturing," Industrial and Engineering Chemistry, 41(3):534–43, 1949.

Nykanen et al., "Aroma Compounds Dissolved from Oak Chips by Alcohol," Progress in Flavour Research, Proceedings of the 4th Weurman Flavour Research Symposium, Dourdan France, 339–46, 1984.

Reazin et al., "Determination of the Congeners Produced from Ethanol During Whisky Muturation, " Journal of the AOAC 59(4):770–76, 1976.

Reazin, "Chemical Mechanisms of Whiskey Maturation," Am. J. Enol. Vitic., 32(4):283–89, 1981.

Rose, (ed.), Alcoholic Beverages, Academic Press. pp. 364–5, 606–07, 676–77, 1977.

Swan and Burtles, "The Development of Flavour in Potable Spirits, " Chemical Society Review, 7(2):201–11, 1978.

Swan, "Maturation of Potable Spirits", Handbook of Food and Beverage Stability: Chemical, Biochemical, Microbiological, and Nutritional Aspects, Ch. 17 801–31, Academic Press, 1986.

Valaer and Frazier, "Changes in Whisky Stored for Four Years", Industrial and Engineering Chemistry, 28(1):92–105, 1936.

*Primary Examiner*—Curtis E Sherrer
(74) *Attorney, Agent, or Firm*—Vinson & Elkins L.L.P.

(57) ABSTRACT

A process for producing an aged beverage, preferably a distilled spirit that is aged in contact with wood, in which raw or partially aged beverage is processed in a closed system with controlled heat and oxygen levels, and in contact with a beverage aging wood product. In certain embodiments ethyl acetate is added to the raw beverage prior to the aging process.

18 Claims, 1 Drawing Sheet

ALL NATURAL ACCELERATED AGING OF DISTILLED SPIRITS

BACKGROUND OF THE INVENTION

1. Field of the Invention

The present invention is related to compositions and methods for aging of beverages, particularly liquids to be aged in the presence of wood, and more particularly to the accelerated aging of distilled beverages.

2. Description of Related Art

Ethanolic distillates aged in wooden containers exhibit myriad chemical changes over the course of several years. These changes are believed to be due to three types of chemical reactions: 1) reactions involving only the distillate components, 2) extraction of wood-derived compounds that are soluble in the distillate, and 3) reactions of the distillate components with the extracted wood compounds (Liebmann and Rosenblatt, *Industrial and Engineering Chemistry*, vol. 35, no. 9, 1943). The present disclosure focuses on reactions among the distillate components, including possible reactions of distillate components and extracted wood-derived components and the unexpected results of a novel modification to the chemical milieu that affects the aging process.

Unaged spirits distillates are composed principally of varying amounts of ethanol, acetaldehyde, water, fatty acid esters and ethyl acetate. An average American whiskey (Bourbon) distillate contains about 12 g/100 PL (grams per 100 liters at 100° proof) of ethyl acetate; and malt whiskey, such as that known as Scotch, as much as 29 g/100 PL of ethyl acetate.

During barrel-aging, the predominant transformation in the distillate in quantitative terms is the linear increase in ethyl acetate due to the oxidation of ethanol. Over the lengthy course of barrel-aging, ethyl acetate may increase from three to six times the amount originally present in the distillate (Reazin; *American Journal of Enology and Viticulture*; vol. 32, no. 4, 1981). In particular, during barrel-aging, ethyl acetate is formed initially from acetic acid already present in the distillate and according to industry investigators, perhaps additionally from acetic acid formed by degradation of the barrel wood. After this initial period, the formation of ethyl acetate is dependent upon the oxidation of ethanol into acetic acid at a uniform, linear rate.

Industry scientific investigators report the mechanism of ethanol transformation during barrel-aging as follows (Liebmann and Rosenblatt, 1943):

1. Ethanol+$O_2$→acetaldehyde
2. Acetaldehyde+$O_2$→acetic acid
3. Barrel wood - - - ↑
4. Ethanol+acetic acid→ethyl acetate+$H_2O$ In conventional barrel-aging, the pH takes about 6 months to drop to the required acidic levels for the various reactions necessary for the development of beverage character to occur. Thereafter, the production of ethyl acetate is dependent upon the formation of acetic acid in the barrel, which takes 36 to 48 months to reach the level of marketable, aged beverages, often 4 years old (Reazin, 1981). It would be desirable in the distillery art to be able to accelerate this process, so that the same character of beverage could be produced in a much shorter time period. The present disclosure provides methods of aging beverages that result in distilled beverages that are aged for much shorter periods, even as short as about 30–40 days or even less, that have the character conventionally achieved only after four years of aging.

SUMMARY OF THE INVENTION

The present disclosure provides an improvement in the aging process of beverages that are normally aged in contact with a wood product such as an oak barrel or other wood product. The invention provides a means of aging a beverage in contact with a wood product, so that the beverage acquires the desired organoleptic characteristics that are associated with wood-aged beverages, in an accelerated manner. The present disclosure provides methods by which a raw distilled liquid may be contained in a closed system and circulated through a flavor transfer cartridge containing a comminuted wood product, thus acquiring the organoleptic character of a matured beverage in a greatly accelerated manner. It is a further aspect of the disclosure that through manipulation of the ethyl acetate levels prior to or during the flavor transfer process in certain beverages, one may further accelerate the aging process. The practice of the processes disclosed herein have allowed the present inventors to age a beverage to attain the characteristics of a conventional four year or longer aging process in just months, and in certain embodiments, in as little as about 15 to 40 days.

It is known in the art that contacting a raw beverage with wood, by storing the beverage in an oak barrel, for example, or by storing the beverage in contact with a prepared wood product allows the beverage to acquire a smooth character and more desirable taste due to extraction of certain compounds from the wood, and also due to the oxidation of certain alcohols and aldehydes. It is also known that certain beverages, including rum, whiskeys such as Bourbons, Scotches, ryes, and certain tequilas owe a large part of their flavor to the concentration of acetic acid in the final product. From looking at the reactions shown in the previous section, it can be seen that in the conventional maturation process, it is widely believed that ethanol is oxidized to acetic acid, and that this acetic acid then reacts with another portion of the ethanol to produce ethyl acetate and water, and that up to ⅔ of the final acetic acid is derived from those oxidation reactions (Reazin, 1981). It is a surprising discovery of the present inventors that, using the processes described herein, the majority of the acetic acid appears to be derived from the wood product. In the conventional aging process, a portion of this acetic acid reacts with ethanol to form ethyl acetate. An aspect of the present disclosure is a method of providing ethyl acetate in the raw beverage, thus "driving" the last step in the reactions shown above in the opposite direction, toward acetic acid. It is contemplated by the inventors, that this allows the beverage to attain higher levels of acetic acid and other desired esters in an accelerated reaction, thus contributing to the accelerated aging process described herein.

It is an aspect of the invention, therefore, that one of skill in the art may determine the level of acetic acid and ethyl acetate in the unaged beverage, and can then add an amount of ethyl acetate to the unaged beverage that is targeted to the final product. This amount may be determined by matching it to the amount found in a similar distillate after conventional aging, or it may be adjusted in order to obtain a beverage with a certain desired flavor or characteristic, such as an increase in fruity or pineapple flavor, for example. This predetermined or target ethyl acetate level that is necessary to achieve the desired final beverage composition may be adjusted by adding ethyl acetate to the raw distillate as described herein, and it may also, in certain embodiments, be added by the "art" of fermentation and distillation to achieve a higher ethyl acetate concentration in the raw distillate.

As discovered by the present inventors, it is typical that about 1 to 2 grams per 100 PL of ethyl acetate will be converted in the final equilibrium during the described aging processes, so that a sufficient amount of ethyl acetate must be added in order to account for that conversion. If, for example, a concentration of about 23 grams per 100 PL ethyl acetate is desired in the aged beverage, then the distillate would be adjusted to have about 23.5, 24 or up to about 26 grams per 100 PL when the aging begins. The amount of ethyl acetate in the mature beverage will depend on the type of beverage and the desired characteristic taste. In light of this knowledge, one of skill in the art could either add the desired amount of ethyl acetate to the raw distillate, or alter the fermentation and distillation conditions in order to achieve the same ethyl acetate level. Either method would, of course, fall within the scope of the disclosed invention.

The present invention may be described in certain aspects, therefore, as a method of maturing a beverage, the method including combining an unaged, or partially aged beverage, and a wood product, and processing said beverage in conditions effective to produce a mature beverage. The invention may also be described as a method of maturing a beverage that includes combining an unaged or partially aged beverage, ethyl acetate, and a wood product; and aging the beverage in conditions effective to produce a mature beverage and wherein the wood product is prepared by the process of comminuting raw, untreated wood into granules, heating the granules to a temperature of from about 100° C. to about 240° C. for a period of at least one hour, contacting the granules with a solution of aqueous ethanol containing from about 50% to about 95% ethanol at a temperature of up to about 55° C., separating the granules from the solution, and heating the granules to a temperature of up to about 220° C. for a period of at least about 15 minutes.

As described herein, a beverage to be aged according to the present disclosure may include any beverage that is aged in contact with wood and is preferably an ethanolic, or ethanol containing beverage, and is more preferably a brown distilled beverage. "Brown distilled beverage" or "brown distilled spirit" is used interchangeably herein and is a term known in the art to mean beverages aged in contact with oak. Preferred embodiments include any type of whiskey, including, but not limited to American Bourbon, Scotch, Irish, rye, Canadian or other whiskey, rum, tequila, brandy, cognac, armagnac, liqueur, mescal, eau de vie, aguardiente, or shogu (shouchuu).

It is understood that the present invention may be practiced in combination with barrel aging of a beverage, to begin or finish a maturing process for a beverage that is partially aged in a barrel. In preferred embodiments, however, the raw distillate, or a partially aged distillate is aged in a liquid impermeable container, and/or a closed system that prevents a loss of water or ethanol, such as may occur when a beverage is aged in an oak barrel or cask. The system may be made of any suitable material, preferably a material that does not react with ethanol as do many metals, and the most preferred system would be made of stainless steel or glass. It is also an aspect of certain preferred embodiments that the aging process may take place at an elevated temperature in order to increase the reaction rates within the beverage. As such, preferred processing conditions may include a temperature of from about 70° to about 170° F., and more preferably from about 120 to about 170° F., and even more preferably from about 140° to about 150° F. It is a further aspect of the preferred embodiment that air or oxygen is provided to the beverage during the aging process.

A wood product as used in the practice of the present invention may be any suitable wood product, and is preferably a charred wood product, and more preferably a comminuted, charred wood product, and more preferably a wood product produced by a process including comminuting raw, untreated wood into particles or granules; heating the granules to a temperature of from about 100° C. to about 240° C. for a period of at least one hour; contacting the granules with a solution of aqueous ethanol containing from about 20% to about 95% ethanol at a temperature of up to about 55° C.; separating the granules from the solution; and heating the granules to a temperature of up to about 220° C. for a period of at least about 15 minutes. A particularly preferred product is a wood product described in co-pending and commonly assigned U.S. patent application Ser. No. 09/449,927, incorporated herein by reference with respect to its description of such product, its characteristics, its method of manufacture, and its basic utility. The product so referenced is produced commercially as e.g., the Allegro™ wood product produced and sold by Kairos Corporation.

The amount of ethyl acetate that is added or that is contained in the distillate prior to aging the beverage is somewhat flexible and is based on the amount of ethyl acetate in the raw beverage and the amount that is desirable in the finished, aged beverage. It is the experience of the present inventors, for example, that one may add enough ethyl acetate to the raw distillate to bring the concentration to a level that is somewhat higher than the desired concentration in the aged beverage. The target level may be based on a concentration found in a product that has been aged in a more conventional manner, whose organoleptic qualities one is trying to match, or a level may be based on a novel desired characteristic of the aged beverage.

In any case, it is contemplated that in the practice of the disclosed invention, one may add any desired level of ethyl acetate that is within the limits of a chemical equilibrium between the ethyl acetate, ethanol, and acetic acid as described herein above, and in certain embodiments would be from as little as a trace of ethyl acetate to from about 2 to about 100 grams per 100 PL of ethyl acetate, or from about 2 to about 30 grams per 100 PL of ethyl acetate inclusive, and including any particular number falling within those ranges. The number will vary, of course, depending on the beverage, and the desired characteristics of the finished or aged product.

An embodiment of the present invention may also be described as a method of maturing an ethanolic beverage to achieve a desired organoleptic character comprising combining a raw distillate; a wood product; and from about 2 to about 100 g/100 PL of ethyl acetate; and aging said beverage in conditions effective to produce a mature ethanolic beverage. An embodiment may also be described as an accelerated aging process for a distilled beverage, effective to produce a beverage with a character of flavor similar to a conventionally aged beverage comprising combining a raw distillate; a wood product; and from about 2 to about 100 g/100 PL of ethyl acetate; and storing said beverage in conditions effective to produce a mature ethanolic beverage. An embodiment may further be described as an accelerated aging process for producing an aged ethanolic beverage, the improvement comprising adding ethyl acetate to a distillate prior to the aging process.

The present invention may also be described in certain embodiments as a process for accelerating the maturation of an unaged or partially aged beverage comprising determining a target concentration of ethyl acetate for the product of the maturation; providing an unaged beverage with from about ½ to about 2½ grams/100° PL of ethyl acetate in excess of the target concentration; flowing the unaged beverage through a closed system wherein the closed system comprises a beverage aging wood product such that a beverage passing through the system contacts the wood product; and processing the beverage in the presence of oxygen for a period of time sufficient to produce a matured beverage. In certain embodiments, a closed system as described will include several containers in fluid connection through a series of pipes or piping and may include a distillate feed tank that may be connected to the output of a still, or that is the storage tank for an unaged beverage. This tank may be connected by piping or tubing to a pump that circulates the beverage through a heat exchanger, a filter and into a device that contains a wood product for aging, or transferring flavor to the beverage. As mentioned above, the distillate should not be in contact with materials that react with ethanol, and a preferred system is constructed of stainless steel.

In certain preferred embodiments, the wood product containing device is an interchangeable cartridge, preferably a stainless steel cartridge that is configured to be temporarily placed in the closed system for use in maturing a single batch or run of the unaged beverage. By interchangeable is also meant that one cartridge may used and then removed from the system without affecting any of the other components. Subsequently another cartridge may be added in its place for the next run. In this way, the system may be set up in a permanent location and used for the aging of many different beverages. A particular cartridge would then be designed for each individual beverage to be aged, and placed into the system for that particular run.

A cartridge includes a connection or port for introducing beverage from the system into the cartridge, includes an interior cavity for holding the wood product and for contacting the wood with the beverage while the beverage passes through the cartridge, and includes an outlet port for circulating the beverage from the cartridge back into the system. In the practice of the disclosed processes, then, one may prepare a cartridge with the amount of wood product necessary to achieve a particular flavor of mature beverage for a given amount of raw distillate. After use, the cartridge may be removed and another cartridge inserted into the system that contains wood product for the next run. In this way, the system provides flexibility in that a raw distillate of a beverage may be processed into a mature beverage with the character of a four year old conventional aging, for example, or it may be processed in the same system to achieve a beverage with a sixteen year old character, for example, by selecting the appropriate cartridge (with the appropriate wood product inside) and the appropriate ethyl acetate concentration in the unaged beverage. For example, a 4 year old rum sample may have less ethyl acetate and/or less acetic acid and other flavor producing esters than a 12 year old rum from the same distiller. Therefore, in order to obtain a mature rum with the 12 year old character, one would add more ethyl acetate to the raw distillate, and would include more wood product, and/or a wood product with flavor characteristics selected to achieve the character of the 12 year old rum.

In certain embodiments, the closed systems disclosed herein will include a pump for circulating the beverage in the system and will contain other elements including, but not limited to an inlet for injecting gas or air into the system, a heat exchanger configured to control the temperature of a beverage in the system, and a flush tank and piping configured to flush the residual beverage from the wood product cartridge after a processing run. This flush may then be used to dilute the mature beverage in those cases in which a lower proof product is desired. The system may also include a valve for sampling the beverage during processing to monitor the chemical or organoleptic properties of the beverage during processing.

An aspect of the present invention is also a matured beverage obtained by the processes disclosed herein. Such beverages may be bottled or packaged without further treatment or mixing, or they may be blended with other spirits or liquids including those of the same or similar type, or with a flavored beverage, such as a fruit flavoring. They may also be blended with a pure grain alcohol, for example, or diluted with water to achieve a desired proof.

A further aspect of the present invention is a beverage flavor transfer cartridge as described above, and configured to fluidly connect into a beverage maturation processing system, wherein the cartridge contains a beverage aging wood product in an amount effective to mature a predetermined amount of unaged, or partially aged beverage. In preferred embodiments the cartridge contains a wood product that is prepared by a process comprising comminuting raw, untreated wood into granules; heating the granules to a temperature of from about 100° C. to about 240° C. for a period of at least one hour; contacting the granules with a solution of aqueous ethanol containing from about 50% to about 95% ethanol at a temperature of up to about 55° C.; separating the granules from the solution; and heating the granules to a temperature of up to about 220° C. for a period of at least about 15 minutes.

DETAILED DESCRIPTION

Figure 1:
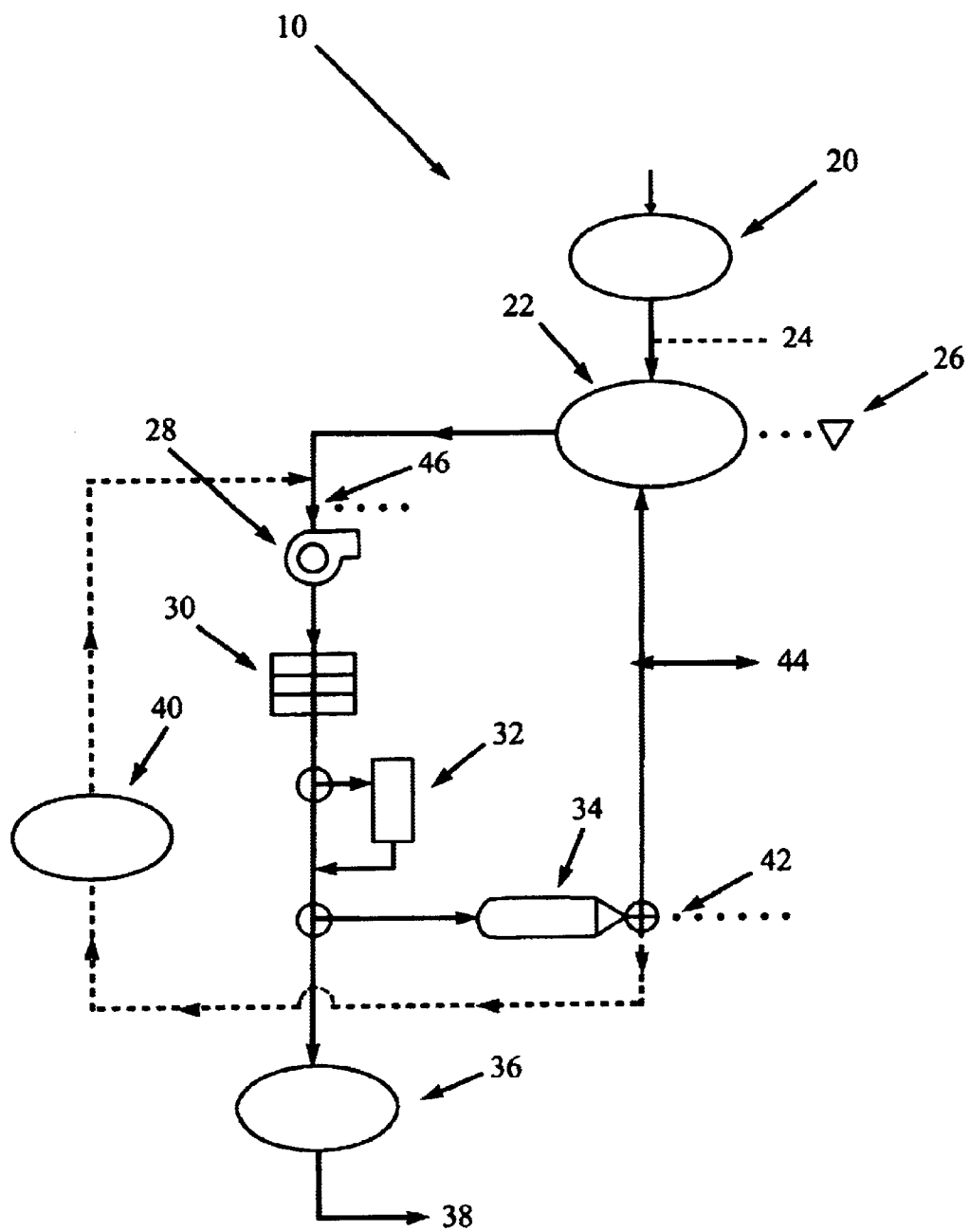
FIG. 1 is a schematic drawing of a preferred embodiment of a flavor transfer system. In the drawing, a solid line indicates the path of a distillate, a dashed line indicates water, and a dotted line indicates a gas.

The present disclosure arises in part from the surprising discovery that reversing the normal chemical pathway that leads to aged spirits, in particular "brown distilled beverages" is an effective means of accelerating the beverage aging process. In the methods disclosed herein, ethyl acetate, produced independently from grain alcohol, may be combined with new distillate and introduced to a prepared wood product, preferably the Allegro™ (Kairos Corporation) wood product known in the art. The preferred process takes place in a closed system, under conditions controlled for heat and oxygen. The addition of ethyl acetate to the ethanolic distillate at the beginning of its interactions with the wood forms a more potent solvent medium and significantly speeds extraction of compounds from the wood.

The slow formation of acetic acid and the subsequent condensation of acetic acid and ethanol to form ethyl acetate in barrel-aging is circumvented by the addition of ethyl acetate to the distillate before subjecting it to maturation procedures. Without limiting the invention to any particular mechanism, it is contemplated that under these conditions, the conversion of acetic acid to ethyl acetate is inhibited by the law of mass action, and that the acetic acid, the majority of which appears to come from the wood product is more readily available to flavor the beverage or to produce other desirable esters in the beverage.

As ethyl acetate is important to aroma and taste, the amount contained in the distillate prior to our maturation procedures is calculated such that, after its partial hydrolysis, the quantitation remaining either equals the amount found in long term barrel-aged product, or has been adjusted in advance for the desired sensory effect. It is an aspect of the methods described herein that the ethyl acetate resulting at the end of the maturation cycle has been "blended" into the beverage character and has become "inherent," as it is in long term barrel-aged products. It is the experience of the inventors that when ethyl acetate is added to beverages after the aging process is complete, the result is an unpleasant "grassy" sensory cast. Moreover, in the practice of the present methods, beverage character can be designed to incorporate the most advantageous amount of the "fruity, pineapple" flavor which is largely ethyl acetate dependent.

The flavor profile of some beverages, most tequilas and rums for example, is not essentially dependent on the flavor derived from ethyl acetate and for those beverages small quantitations of ethyl acetate suffice to affect the desired final sensory profile. Fermentation and distillation of these distillates yield low amounts of ethyl acetate ex-still. As a consequence of this, after barrel-aging, the resulting level of ethyl acetate in these beverages is below about 10 g/100 PL. In these cases, the amount of ethyl acetate added to the unaged distillate may be the small amount which degrades to the quantitation of acetic acid necessary to promote the formation of the multitude of other beverage compounds. In other cases, the quantitation of ethyl acetate ex-still may be sufficient without an additional amount to effectuate maturation if an effective wood product and procedures are employed.

An example of a closed system as described herein is shown in FIG. 1. The system shown 10 includes a distillate feed tank 20 connected to an in process flavor transfer tank 22 for holding the raw distillate. Diluting water from a flush of the system may be added through a port 24 to a distillate and volatiles may also be vented through vent 26, condensed and either discarded or added back into the system. A pump 28 circulates the beverage though the system and through a heat exchanger 30 and filter 32. The system also includes a gas or air port 46 that may be connected to a source of gas, such as compressed air or oxygen to oxygenate the beverage during the flavor transfer processing. The beverage is circulated through a wood product containing cartridge 34 and returned to the in-process flavor transfer tank for re-circulation through the system. The mature beverage is removed to a tank 36 and packaged 38. The system shown also includes a water tank 40 for flushing the system and the wood product cartridge 34 after a run. The cartridge may also be vacuum dried through an air port 42. As shown, the system also contains a port 44 for sampling liquid to monitor the product and system during a processing run.

The following chart contrasts elements of the Allegro™ aging process as described herein and in co-pending and commonly assigned U.S. Ser. No. 09/449,927, with typical elements of barrel-aging of American whiskey, or Bourbon:

| Barrel-Aging | Allegro ™ Aging |
|---|---|
| Distillate ex-still put in barrel; undesirable compounds in barrel wood sometime teach into beverage. | Allegro ™ wood granules and distillate put in stainless steel vessel; undesirable compounds removed from Allegro ™ wood. |
| Ratio of distillate to barrel wood not important; much waste of barrel wood. | Ratio of Allegro ™ wood granules to distillate improves congener balance and beverage flavor. |
| Ethyl Acetate quantitation is ex-still when distillate is put into barrel. | Ethyl acetate added to distillate at start of maturation process to effectuate maturation reactions and final congener quantitations and balance. |
| Ethyl acetate forms slowly to acceptable levels in 36–48 months. | Ethyl acetate degrades in presence of wood granules to create acetic acid; ethyl acetate integrated into beverage character. |
| Solvent properties of ethyl acetate develop only as ethyl acetate is slowly formed from acetic acid, a product of ethanol oxidation; extraction of wood compounds from the barrel proceed slowly (char often a factor)-3–4 years minimum required. | Solvent properties of ethyl acetate/ethanol mixture facilitates extraction of desired compounds from granular wood in approximately 40 days or less. |
| pH drops to about 4.2 for required beverage reactions in 6 months. | pH drops to about 4.2 quickly; required beverage reactions commence immediately. |
| Permeation into and out of barrel wood results in slow leaching of compounds from barrel. | Distillate ethyl acetate solvent pumped over granules-significantly speeds and increases amount of extraction. |
| Ambient heat and oxygen slowly drive necessary extraction and oxidation reactions over 3–4 years. | Controlled heat and oxygen drive forward necessary extractions and oxidation reactions rapidly. |
| Acetaldehyde required for beverage "sharpness" and to maintain beverage flavor profile; dependent upon oxidation of ethanol and presence of barrel wood; proceeds slowly. | Acetaldehyde required forms rapidly in appropriate quantitations; dependent upon proper amount of Allegro ™ wood and oxygen. |
| Beverage quality inconsistent. | Beverage quality consistent. |
| Ten (10%) percent of distillate lost to soakage into barrel wood; three (3%) percent annually lost to evaporation. | Small, unmeasurable amount of fugitive emissions are lost. |
| In maturing whiskey, oak lactone (indispensable in American whiskey) forms linearly over time to acceptable levels in about 4 years-thought to take "time" for formation. | Oak lactone forms from its precursors in 40 days in levels exceeding 4 year barrel-aging. |

-continued

| Barrel-Aging | Allegro ™ Aging |
|---|---|
| Maturation costs as much as eighty (80%) percent of content cost. | Maturation costs reduced by 25 to 50 percent. |

The following example is included to demonstrate preferred embodiments of the invention. It should be appreciated by those of skill in the art that the techniques disclosed in the example which follows represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

The following study documents the efficacy of the disclosed method.

Ethyl acetate was determined by gas chromatography using a Shimadzu GC-14A fitted with a 30 m capillary RTX-1 (non-polar, Restek) column. Methylene chloride extracts were analyzed. Acetic acid was determined by high performance liquid chromatography (HPLC) using a Shimadzu LC-10ADVP equipped with an SPD-10ADVP ultraviolet detector set at 208 nm. Direct injection of sample onto an octadecylsilyl (C-18, Restek) column operating in reverse phase was employed. Chromatographic standards were obtained from Aldrich, and 95% ethanol was from McCormick Distilling Company. A corning 440 pH meter was used to determine pH.

Acetic acid (AcCOOH) and ethyl acetate (EtOAc) levels in neutral spirits at 125 proof were monitored over a 35 day period in the presence of a Kairos wood product contained in Flavor Transfer Devices as described herein and also without wood at 150° C. The results are shown in Table 1, and the quantities are in units of g/100 PL. Although these are preliminary results and have not been statistically analyzed, the initial indication is that the acetic acid is not formed primarily from ethyl acetate as has been described for conventional barrel aging. Rather, the acetic acid appears to be derived from the wood product as discussed above.

TABLE 1

| Wood | initial EtAc | initial AcCOOH | 24 hour EtAc | 24 hour AcCOOH | 7 day EtAc | 7 day AcCOOH | 35 day EtAc | 35 day AcCOOH |
|---|---|---|---|---|---|---|---|---|
| none | 0 | 2.26 | 1.10 | 7.07 | 1.05 | 8.72 | 4.34 | 17.27 |
| none | 60 | 2.57 | 60.17 | 6.34 | 60.82 | 6.68 | 59.27 | 11.78 |
| Kairos | 0 | 2.26 | 1.20 | 31.97 | 4.05 | 30.81 | 6.00 | 35.26 |
| Kairos | 60 | 2.57 | 59.59 | 27.61 | 61.46 | 29.24 | 59.64 | 31.28 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents that are chemically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.
(1) "Changes in Whiskey While Maturing", Liebmann and Rosenblatt, *Industrial and Engineering Chemistry*, vol. 35, no. 9, 1943.
(2) "Chemical Mechanisms of Whiskey Maturation", Reazin; *American Journal of Enology and Viticulture*; vol. 32, no. 4, 1981.
(3) *Official Method of Analysis of the Association of Official Analytical Chemists*, Fourteenth Edition, 1984.

What is claimed is:
1. A process for accelerating the maturation of an unaged or partially aged beverage comprising:
 (a) determining a target concentration of ethyl acetate for the product of said maturation;
 (b) providing an unaged or partially aged beverage with from about ½ to about 2½ grams/100 PL of ethyl acetate in excess of said target concentration;
 (c) flowing said beverage of step (b) through a closed system wherein said closed system comprises a beverage aging wood product such that a beverage passing through said system contacts said wood product; and
 (d) processing said beverage in the presence of oxygen for a period of time sufficient to produce a matured beverage;
 wherein said beverage-aging wood product is prepared by the process of:
 (i) comminuting raw, untreated wood into granules;
 (ii) heating said granules to a temperature of from about 100° C. to about 240° C. for a period of at least one hour;
 (iii) contacting the granules with a solution of aqueous ethanol containing from about 50% to about 95% ethanol at a temperature of up to about 55° C.;
 (iv) separating the granules from the solution; and

(v) heating the granules to a temperature of up to about 220° C. for a period of at least about 15 minutes.

2. The process of claim 1, wherein said beverage aging wood product is contained in an interchangeable cartridge.

3. The process of claim 1, wherein said system comprises a pump for circulating said beverage in said system.

4. The process of claim 1, wherein said system comprises an inlet for injecting gas or air into said system.

5. The process of claim 1, wherein said system comprises a heat exchanger configured to control the temperature of a beverage in said system.

6. The process of claim 1, wherein said system is configured to flush said wood product after a processing run.

7. The process of claim 1, wherein said system comprises a filter configured to filter said beverage during or after the maturation processing.

8. The process of claim 1, wherein said system comprises a valve for sampling said beverage during processing.

9. The process of claim 1, wherein said beverage is an ethanolic beverage.

10. The process of claim 1, wherein said beverage is a brown distilled spirit.

11. The process of claim 1 wherein said beverage is processed at a temperature of from about 70° to about 170° F.

12. A process according to claim 1, wherein from about a trace to about 250 grams per 100 PL ethyl acetate are added to the beverage prior to processing.

13. A process according to claim 1, wherein from about 2 to about 30 grams per 100 PL ethyl acetate are added to the beverage prior to processing.

14. A process according to claim 6, wherein water used to flush said wood product is combined with the mature beverage to obtain a diluted matured beverage.

15. A method of maturing an ethanolic beverage to achieve a desired organoleptic character comprising:

(a) combining
  (i) a quantity of a raw distillate for maturation;
  (ii) an amount of a beverage-aging wood product sufficient to effect the maturation; and
  (iii) from about 2 to about 100 grams of ethyl acetate per 100° proof liter of the raw distillate; and (b) processing said beverage under conditions effective to produce the maturation of the ethanolic beverage.

16. The method of claim 15, wherein said beverage is a brown distilled spirit or a concentrate of a brown distilled spirit.

17. The method of claim 15, wherein said beverage is Bourbon, Scotch, Irish, rye, Canadian or other whiskey, rum, tequila, brandy, cognac, armagnac, liqueur, mescal, eau de vie, aguardiente, or shogu (shouchuu).

18. In a maturation process for producing an aged ethanolic beverage, the improvement which comprises adding ethyl acetate prior to or during the maturation process in a quantity sufficient to accelerate the maturation.

* * * * *